(12) United States Patent
Kanehisa et al.

(10) Patent No.: US 6,435,622 B1
(45) Date of Patent: Aug. 20, 2002

(54) BICYCLE HUB WITH THREADED SPACER AND DETACHABLE FREEWHEEL

(75) Inventors: Takanori Kanehisa, Osaka; Kenji Ose, Sakai, both of (JP)

(73) Assignee: Shimano Inc., Osaka (JP)

( * ) Notice: Subject to any disclaimer, the term of this patent is extended or adjusted under 35 U.S.C. 154(b) by 62 days.

(21) Appl. No.: 09/729,715

(22) Filed: Dec. 6, 2000

(51) Int. Cl.7 .............................................. B60B 27/00
(52) U.S. Cl. .................................. 301/110.5; 301/124.2
(58) Field of Search ........................... 301/110.5, 110.6, 301/105.1, 124.2; 411/368

(56) References Cited

U.S. PATENT DOCUMENTS

| | | | |
|---|---|---|---|
| 4,567,973 A | * 2/1986 | Butz | 301/105.1 |
| 4,971,397 A | * 11/1990 | Nichols et al. | 301/105.1 |
| 5,383,716 A | * 1/1995 | Stewart et al. | 301/124.2 |
| 5,494,390 A | 2/1996 | Gonzales | 411/368 |
| 5,823,555 A | * 10/1998 | Ashman | 301/110.5 |
| 5,961,186 A | * 10/1999 | Phillips | 301/110.5 |
| 5,984,423 A | * 11/1999 | Becker | 301/110.5 |
| 6,089,675 A | * 7/2000 | Schlanger | 301/124.2 |

FOREIGN PATENT DOCUMENTS

| | | |
|---|---|---|
| DE | 1155355 | 4/1964 |
| DE | 9218358 | 3/1994 |
| EP | 94649 | 11/1983 |
| EP | 890505 | 1/1999 |
| EP | 835188 | 9/1999 |
| FR | 1093378 | 5/1955 |
| FR | 2188551 | 1/1974 |
| FR | 2501124 | 9/1982 |
| FR | 2776612 | 10/1999 |
| GB | 572237 | 9/1945 |
| GB | 668943 | 3/1952 |
| IT | 596057 | 7/1959 |
| JP | 5551601 | 4/1980 |

* cited by examiner

Primary Examiner—S. Joseph Morano
Assistant Examiner—Long Bao Nguyen
(74) Attorney, Agent, or Firm—Shinjyu Global IP Counselors, LLP

(57) ABSTRACT

A bicycle hub includs a hub axle, a hub body, a sprocket support member and a spacer. The hub axle has first and second portions threadedly coupled together via a first threaded connection. The hub body has an outer tubular portion and an interior passageway with the first portion of the hub axle rotatably supported therein. The sprocket support member is releasably and non-rotatably coupled to the outer tubular portion and is mounted on the second portion of the hub axle. The spacer is non-rotatably and axially movably supported on the first portion of the hub axle and is threadedly coupled to the hub body via a second threaded connection. The first and second threaded connections are configured such that rotation of the hub axle to release the first and second portions causes the spacer to move axially toward the hub body.

30 Claims, 13 Drawing Sheets

BICYCLE HUB WITH THREADED SPACER AND DETACHABLE FREEWHEEL

BACKGROUND OF THE INVENTION

1. Field of the Invention

This invention generally relates to a bicycle hub with a detachable freewheel. More specifically, the present invention relates to a bicycle hub with a threaded spacer provided on a two-part axle to allow separation of a sprocket support member from the hub body without removing the freewheel from the rear fork of the bicycle.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving the components of the bicycle. One particular component of the bicycle, which has been extensively redesigned over the past years, is the rear bicycle hub.

Specifically, most bicycles have several speeds. Accordingly, the rear bicycle hub usually includes a freewheel. The freewheel includes at least one chain engaging sprocket. One popular form of drive train and freewheel for a bicycle includes a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is usually provided with a freewheel that has a one-way clutch.

Freewheels are used to transmit a driving force to the rear bicycle wheel in one rotation direction only. These freewheels are usually mounted on the rear hub of a bicycle. Freewheels typically allow the bicycle to advance freely without any rotation of the pedals. Freewheels usually include boss type freewheels which are mounted on the boss of the rear hub by being screwed onto the rear hub, and free hub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part. A one-way clutch is installed between the outer tubular part and inner tubular part for transmitting the driving force from the outer tubular part to the inner tubular part in one rotational direction only. The outer tubular part usually has a plurality of gears mounted thereon, while the inner tubular part is usually mounted on the rear hub of the bicycle.

Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

With the increased number of speeds provided by a derailleur of a bicycle today, a multi-step sprocket wheel unit for the rear wheel includes an increased number of sprockets which is now usually at least five to seven. With the increased number of gears or sprockets, a wider range of torque can be applied from the sprockets to the freewheel. Often the sizes of the sprockets (i.e. the number of gear teeth on the sprockets) are configured for certain riding conditions, such as hilly or flat conditions. Moreover, the configuration of the sprockets or gears is designed for different rider skill levels or rider preferences. Accordingly, sometimes it is necessary to change freewheels or the entire rear wheel depending on the rider or riding conditions. Therefore, there are demands for a simplified mounting structure and an easy mounting method.

Furthermore, as the number of rear gears or sprockets have increased over the years, the freewheel has become larger and heavier. Additionally, with the increased number of gears or sprockets, rear hubs and freewheels can be complicated and expensive to manufacture and install. Moreover, with the increased number of gears or sprockets, it can be difficult to remove the rear wheel from the bicycle frame or to replace an existing freewheel with a different freewheel.

In view of the above, there exists a need for a bicycle hub with a detachable freewheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with a threaded spacer for a detachable freewheel that has a simplified structure.

Another object of the present invention is to provide a bicycle hub with a threaded spacer for a detachable freewheel that allows simplified mounting.

Another object of the present invention is to provide a bicycle hub with a threaded spacer for detaching a freewheel from a hub body that is relatively simple and inexpensive to manufacture and assemble.

The foregoing objects can basically be attained by providing a bicycle hub, comprising a hub axle, a hub body, a sprocket support member and a spacer. The hub axle has first and second portions threadedly coupled together via a first threaded connection. The hub body has an outer tubular portion and an interior passageway with the first portion of the hub axle being rotatably supported therein. The sprocket support member is releasably and non-rotatably coupled to the outer tubular portion of the hub body and the sprocket support member is mounted on the second portion of the hub axle. The spacer is non-rotatably and axially movably supported on the first portion of the hub axle at a free end of the hub body. The spacer is threadedly coupled to a portion of the hub body via a second threaded connection. The first and second threaded connections are configured such that rotation of the hub axle to release the first and second portions causes the spacer to move axially toward the hub body.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

Figure 1:
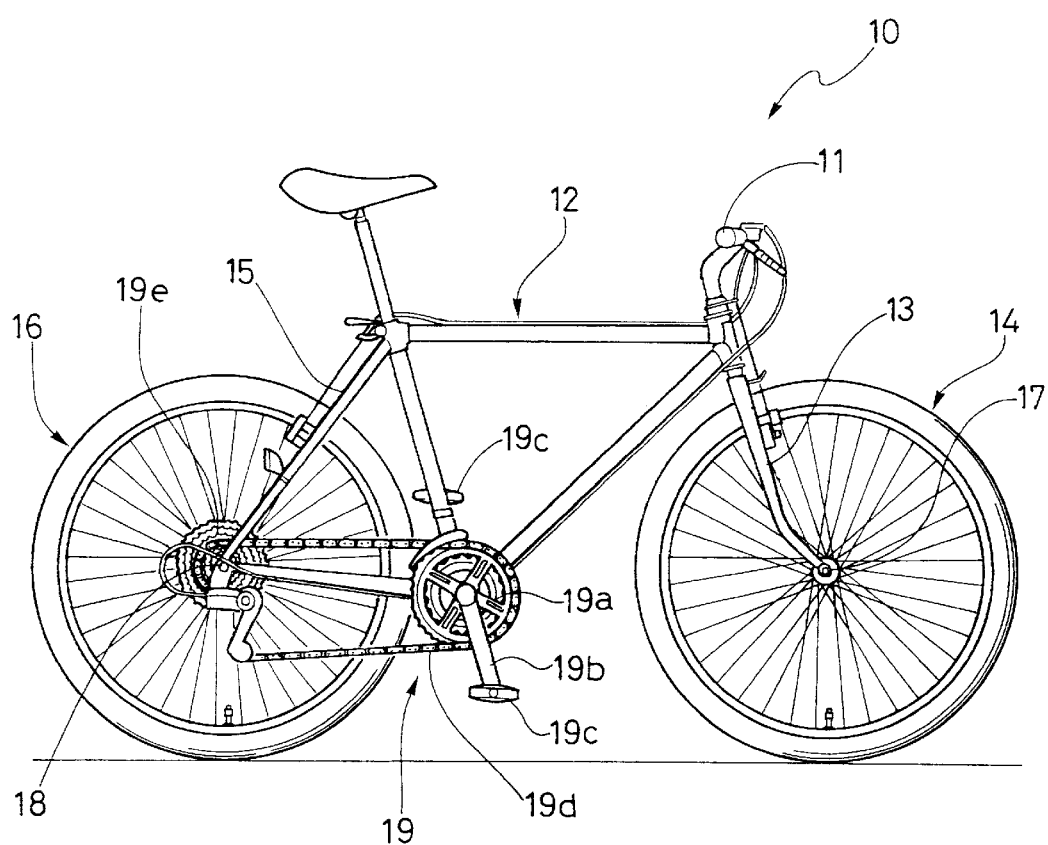
FIG. 1 is a side elevational view of a conventional bicycle with a rear bicycle hub in accordance with the present invention.
Figure 2:
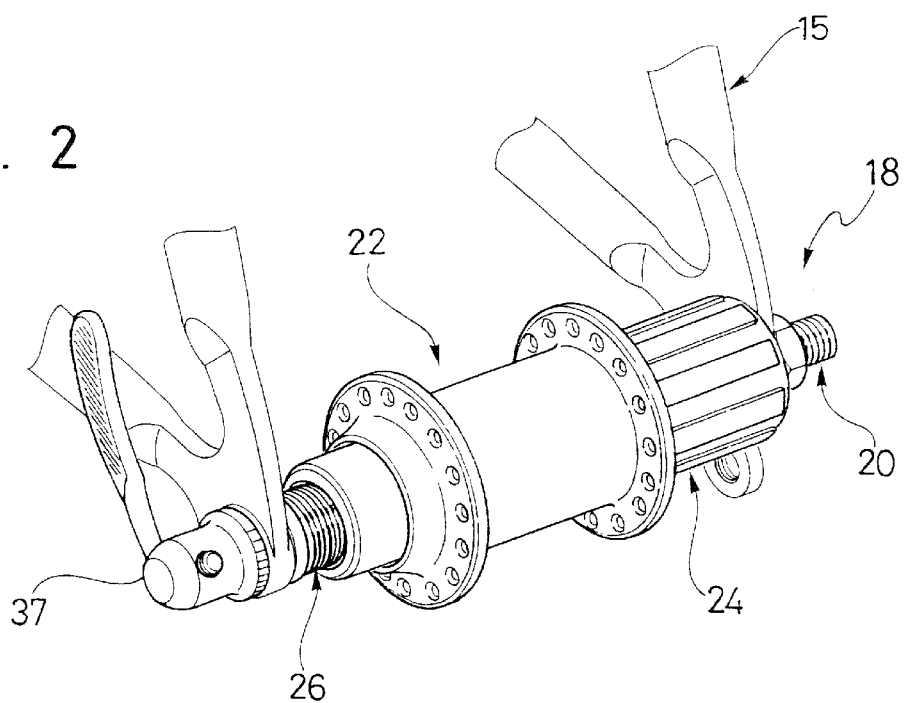
FIG. 2 is an enlarged perspective view of the rear hub mounted on the rear fork of the bicycle illustrated in FIG. 1 with a spacer in accordance with the present invention located in a first position.
Figure 3:
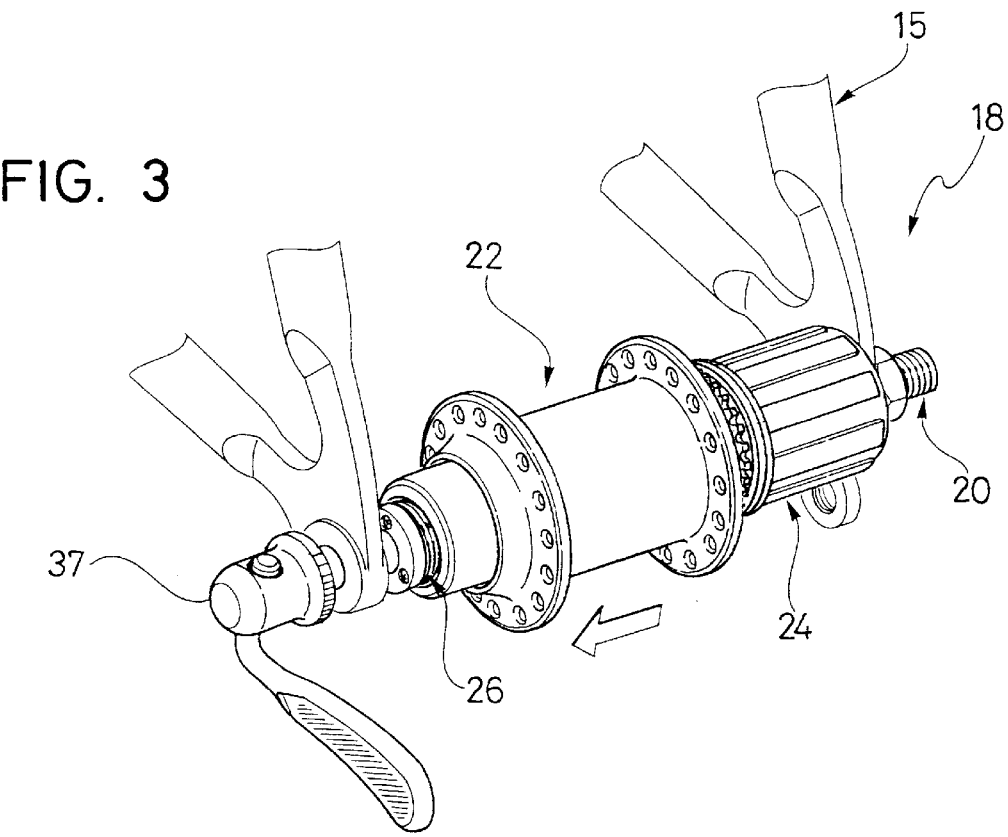
Figure 4:
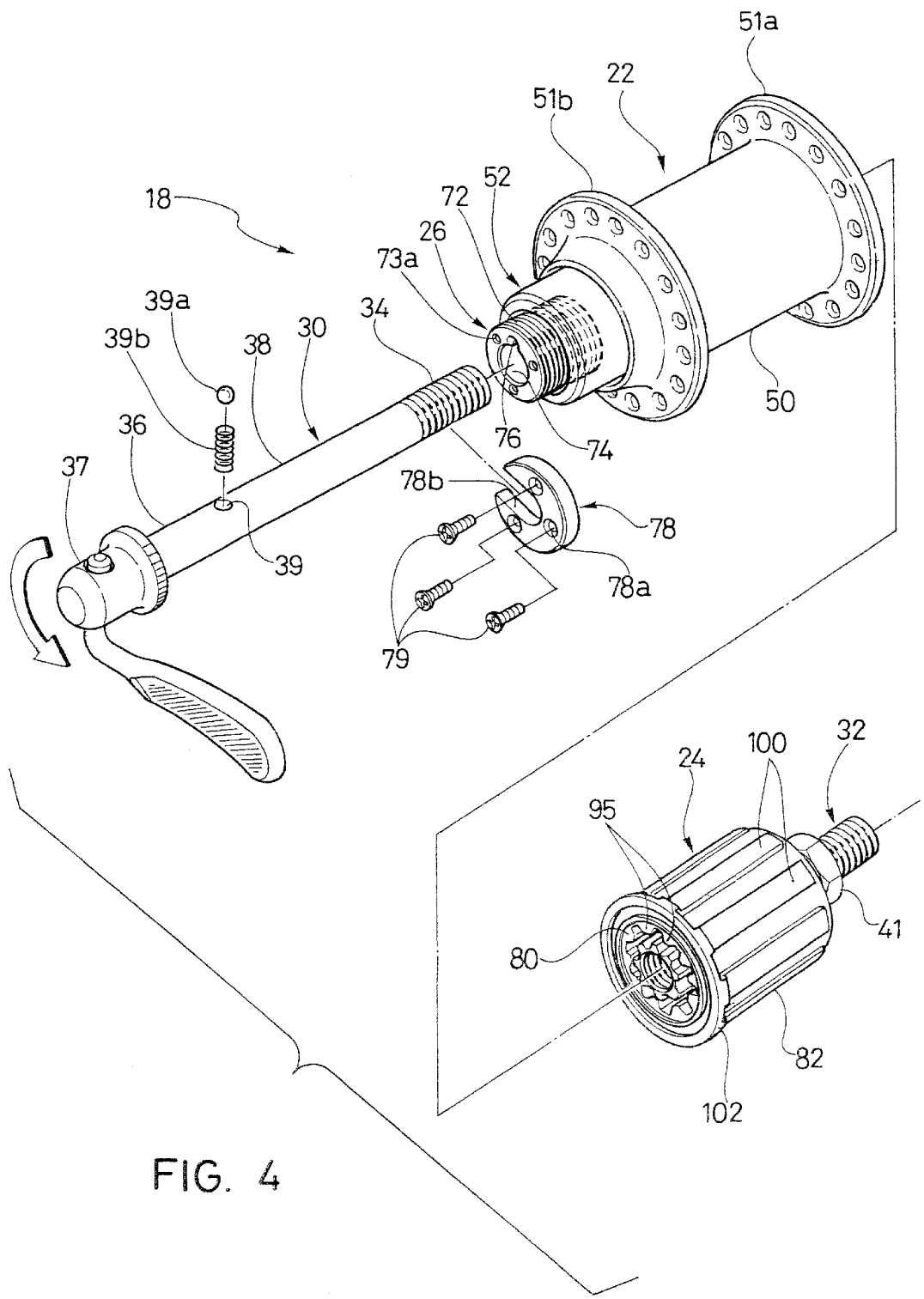
Figure 5:
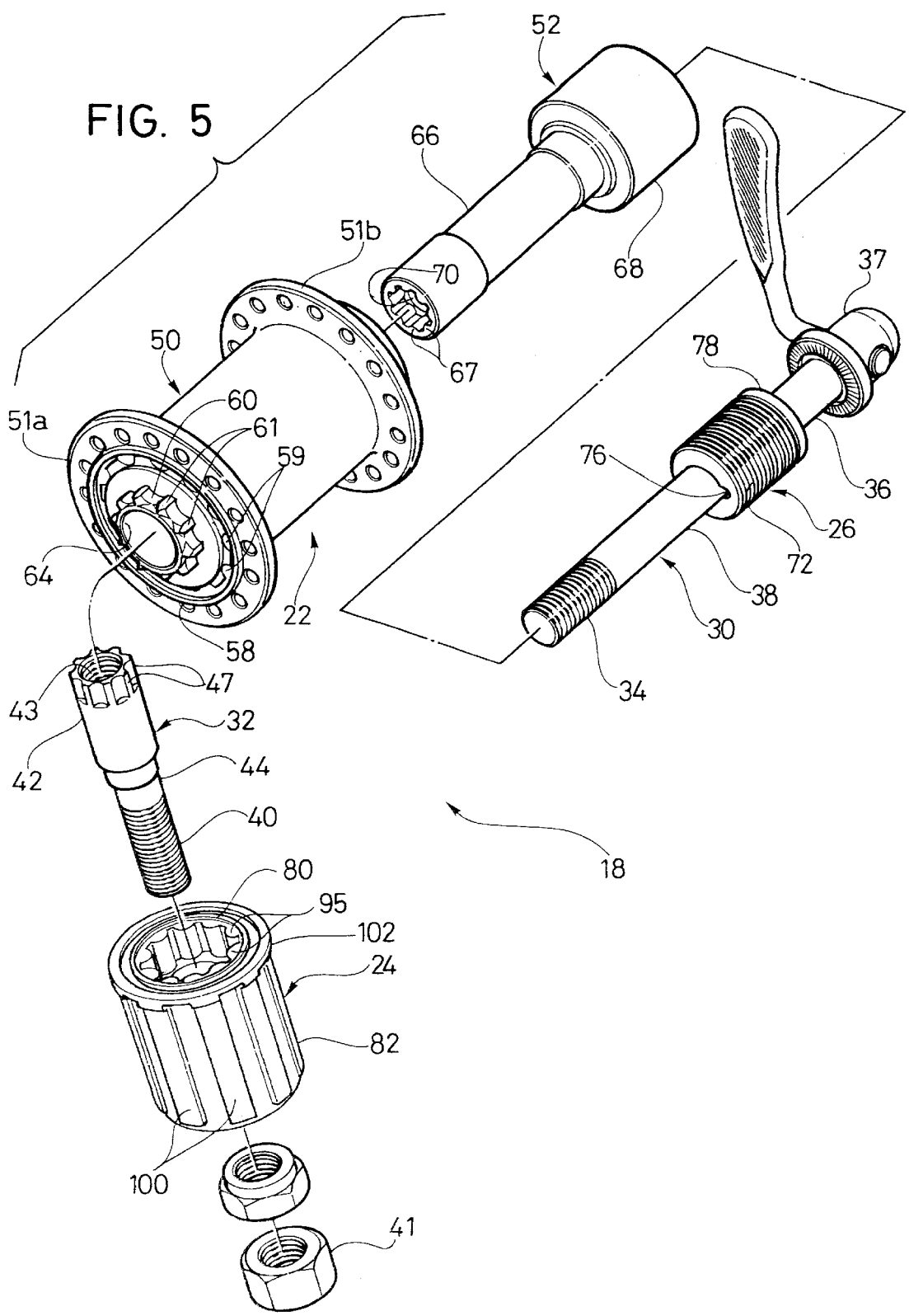
Figure 6:
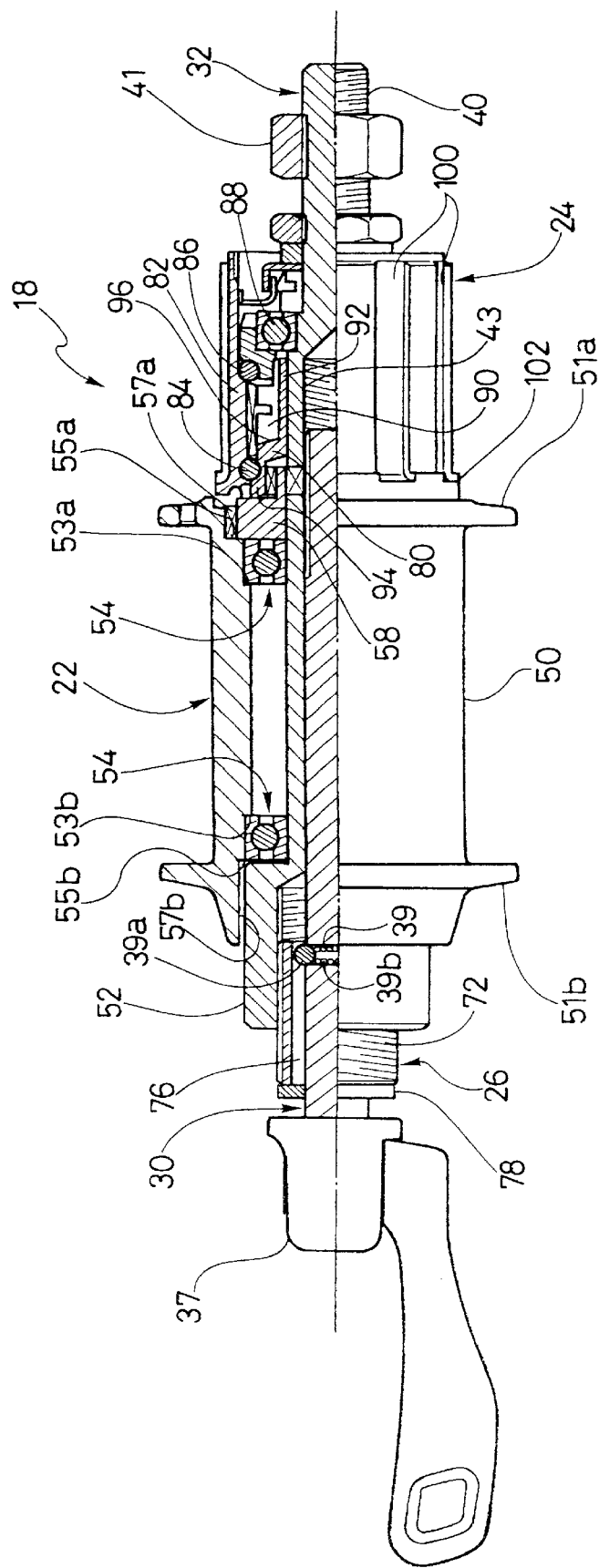
Figure 7:
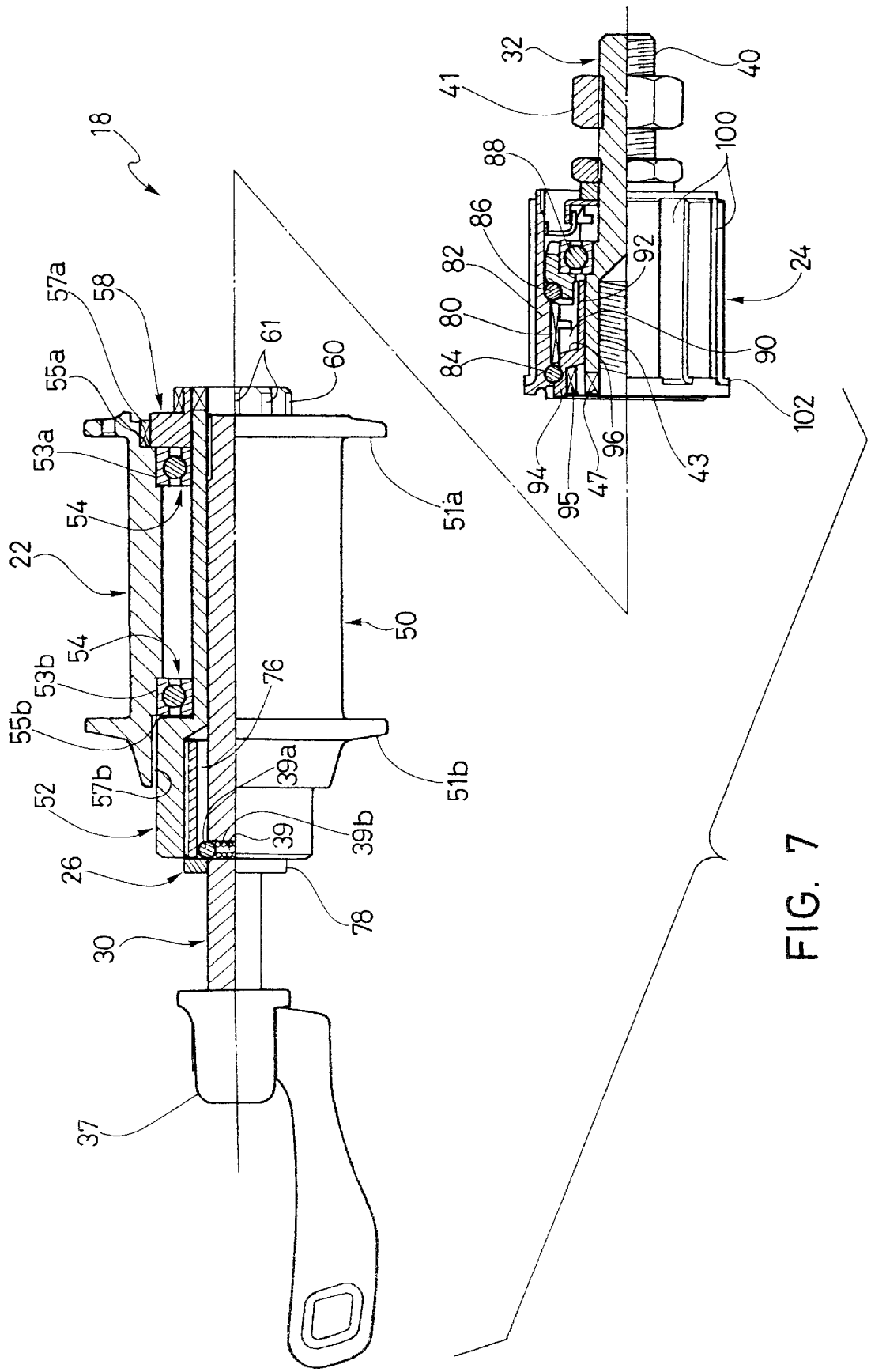
Figure 8:
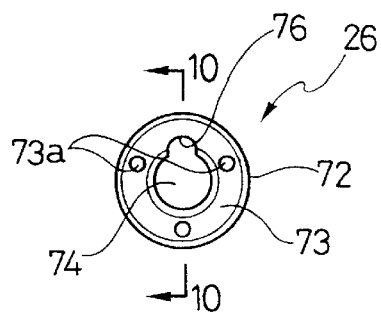
Figure 9:
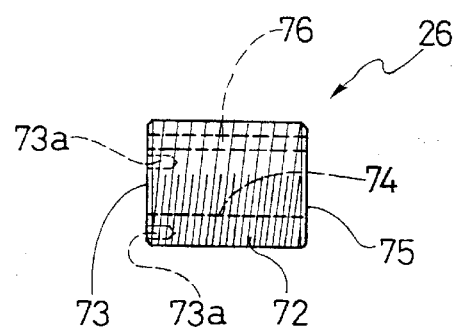
Figure 10:
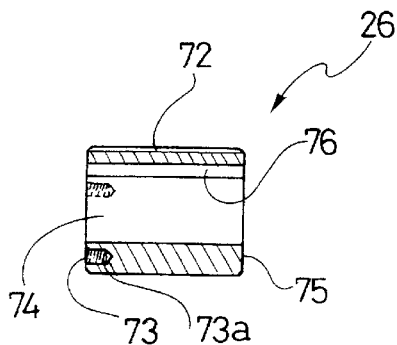
Figure 11:
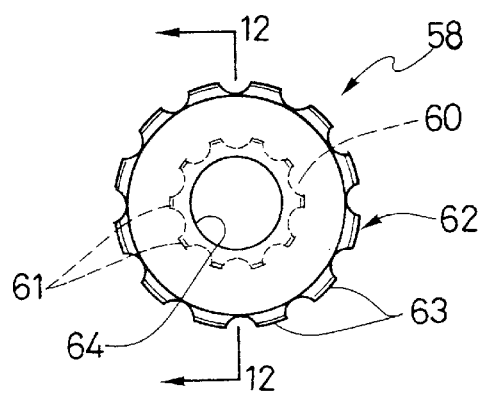
Figure 12:
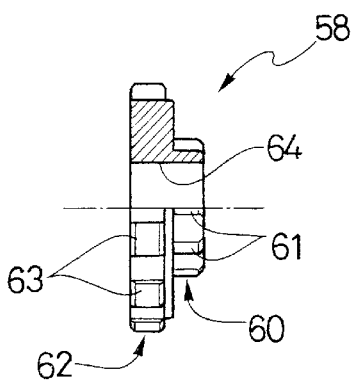
Figure 13:
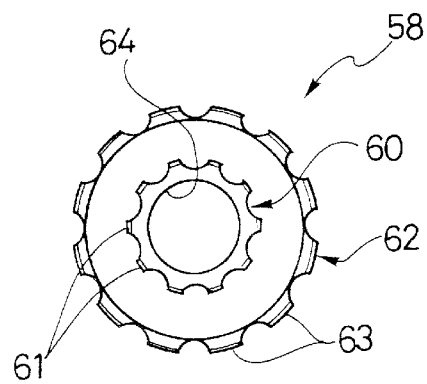
Figure 14:
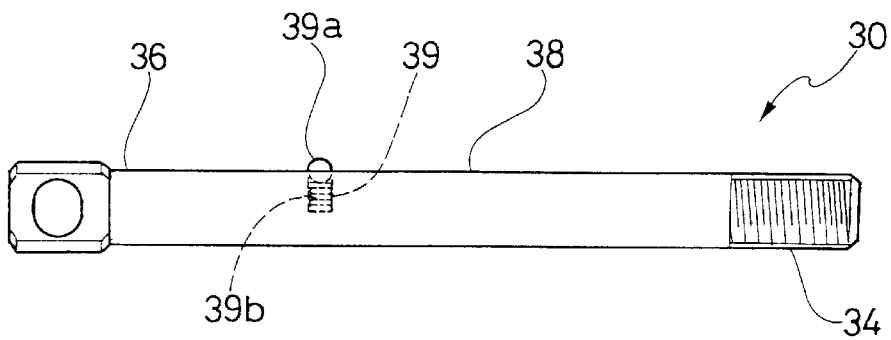
Figure 15:
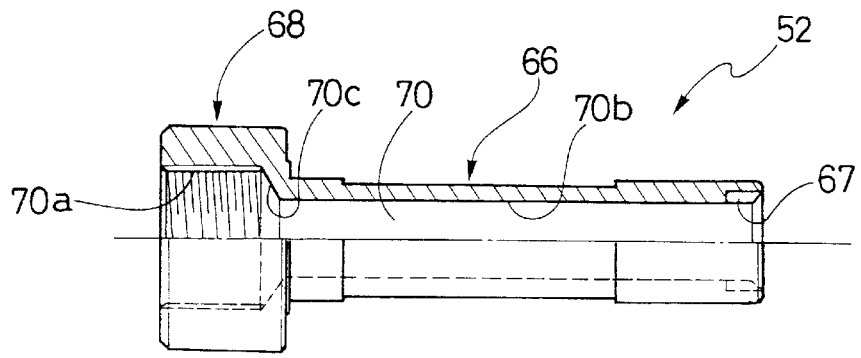
Figure 16:
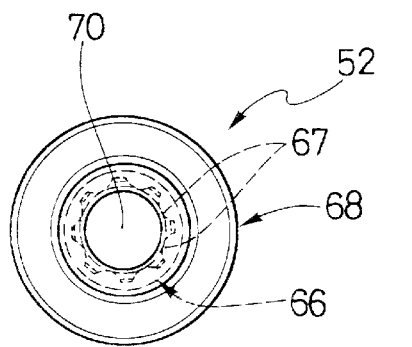
Figure 17:
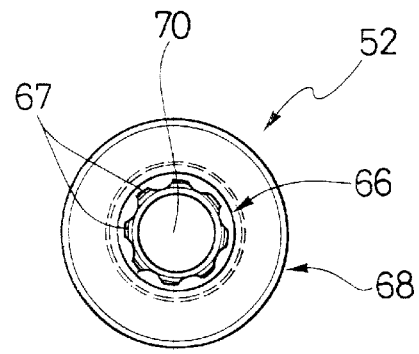
Figure 18:
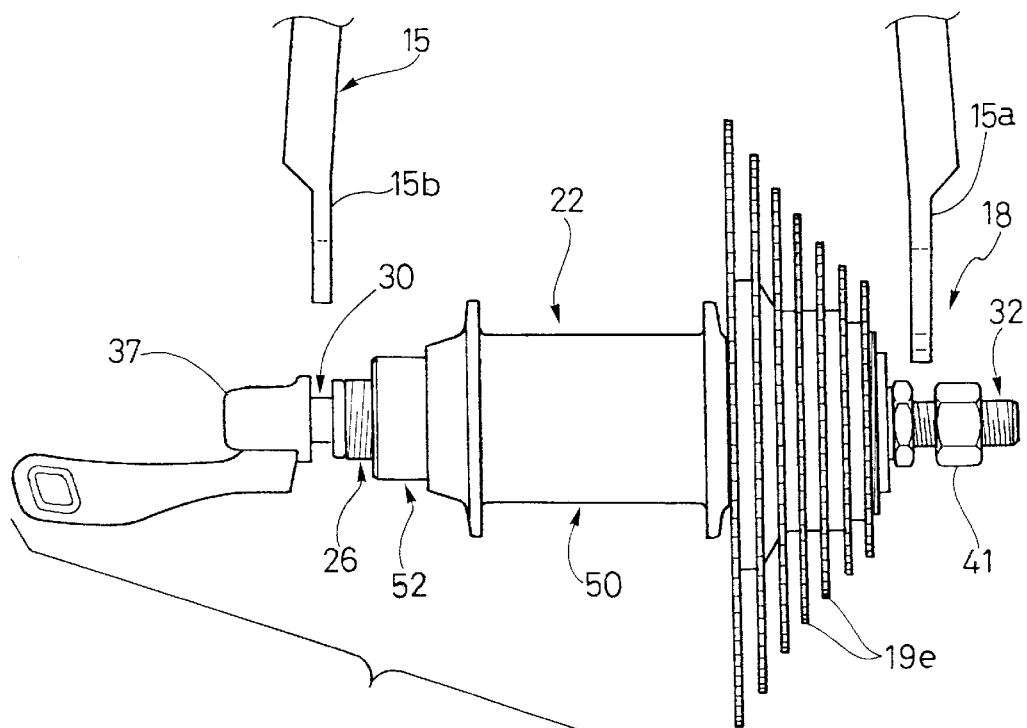
Figure 19:
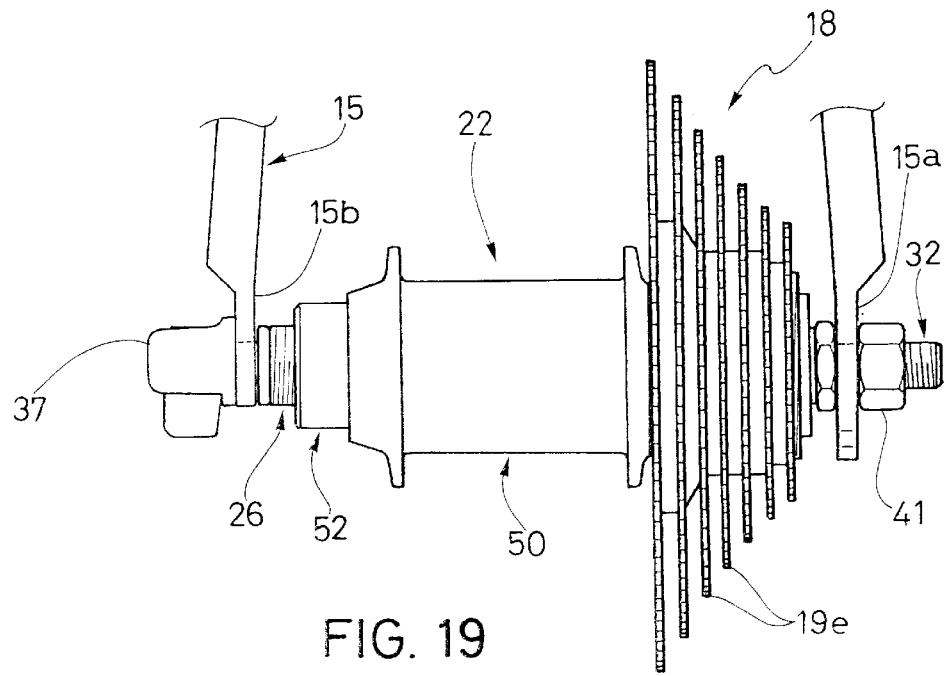
Figure 20:
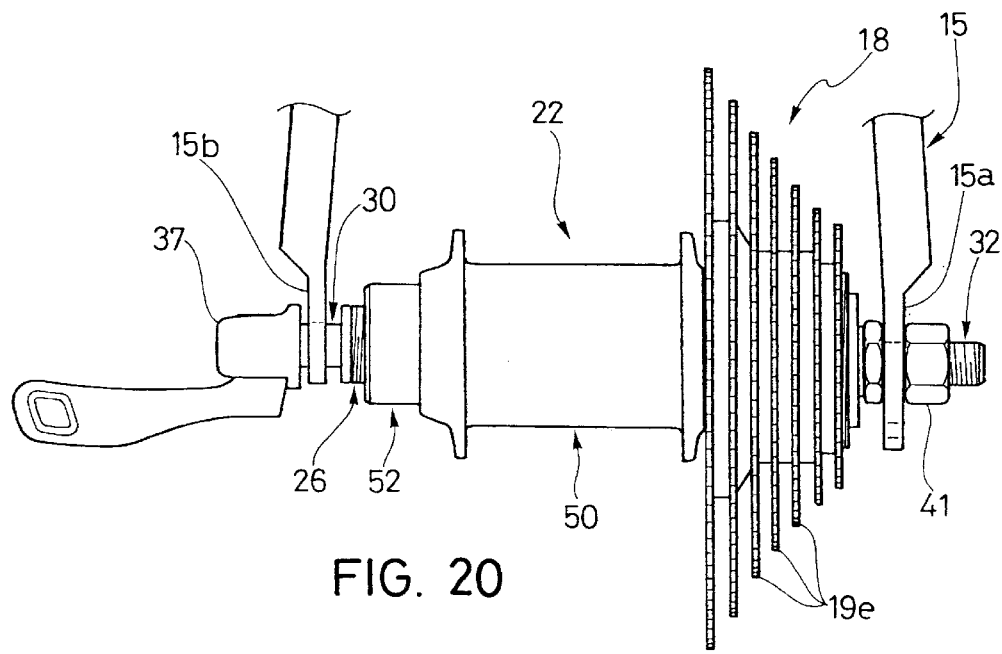
Figure 21:
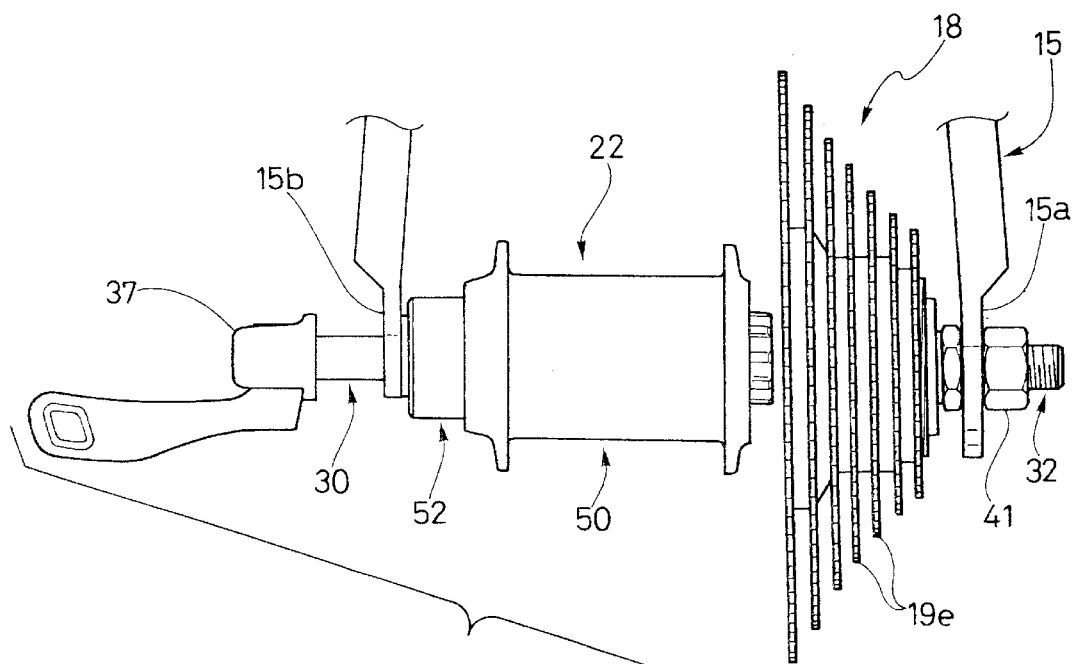
Figure 22:
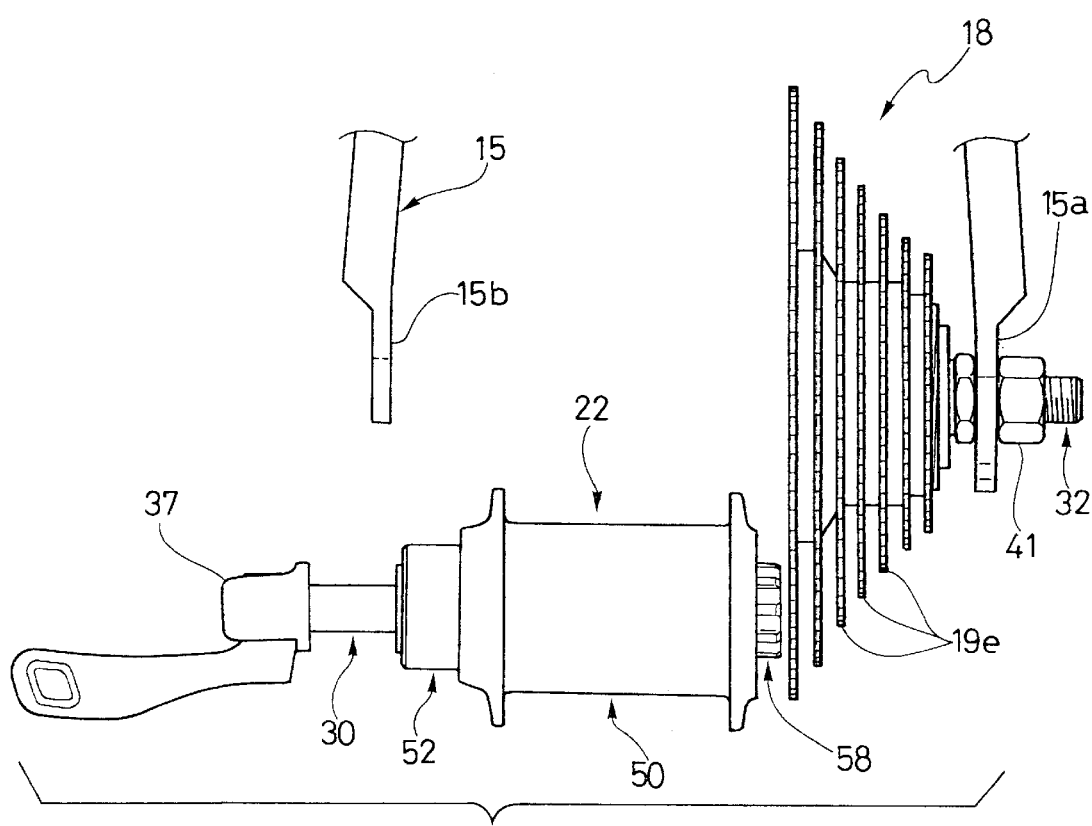
Figure 23:
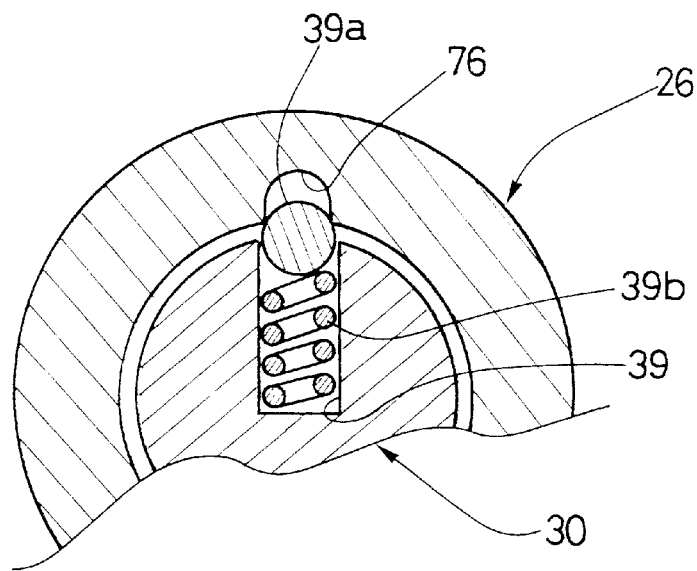
Figure 24:
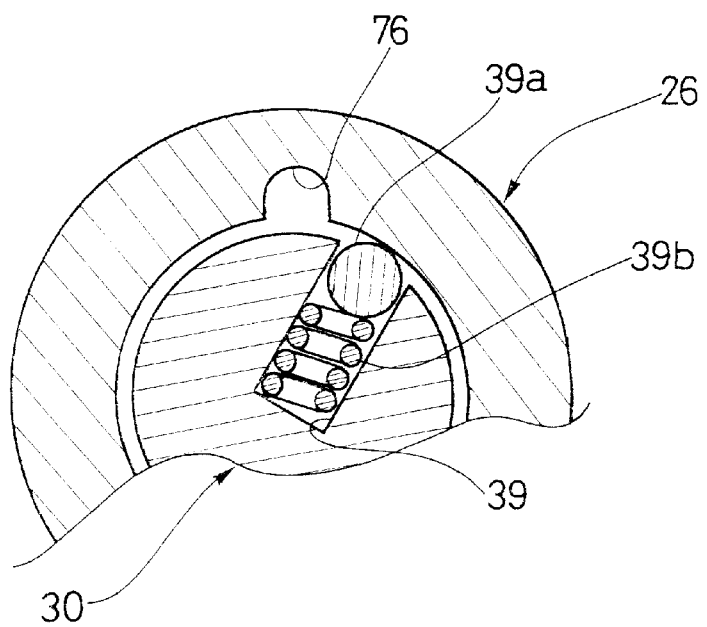
Figure 25:
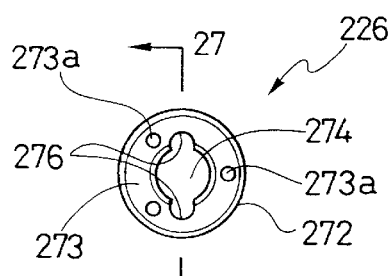
Figure 26:
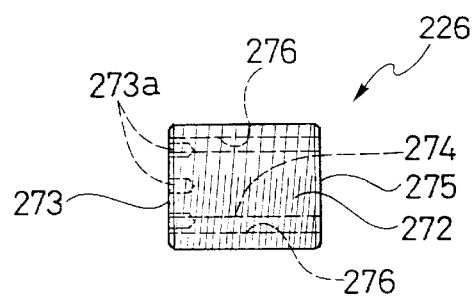
Figure 27:
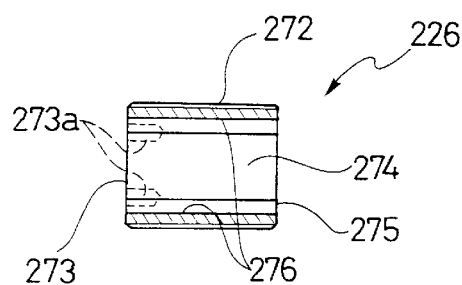
Figure 28:
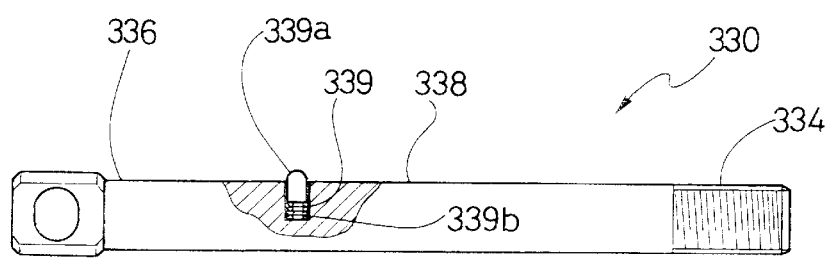

FIG. 3 is an enlarged perspective view of the rear hub mounted on the rear fork of the bicycle illustrated in FIG. 2 with the spacer located in a second or release position;

FIG. 4 is an enlarged, partially exploded perspective view of the rear hub illustrated in FIGS. 1–3;

FIG. 5 is an enlarged, partially reversed, partially exploded perspective view of the rear hub illustrated in FIGS. 1–4;

FIG. 6 is an enlarged, partial cross-sectional view of the assembled rear hub illustrated in FIGS. 1–5 with the spacer in a first position;

FIG. 7 is a partial cross-sectional view of the rear hub illustrated in FIG. 6 with the freewheel detached from the hub body and the spacer in a second position;

FIG. 8 is an outer end elevational view of the spacer of the rear hub illustrated in FIGS. 2–7;

FIG. 9 is a side elevational view of the spacer illustrated in FIG. 8;

FIG. 10 is a cross-sectional view of the spacer illustrated in FIGS. 8 and 9 as viewed along section line 10—10 of FIG. 8;

FIG. 11 is an end elevational view of the engagement member of the rear hub illustrated in FIGS. 2–7;

FIG. 12 is a partial, cross-sectional view of the engagement member illustrated in FIG. 11 as viewed along section line 12—12 of FIG. 11;

FIG. 13 is an opposite end elevational view of the engagement member illustrated in FIGS. 11 and 12;

FIG. 14 is a side elevational view of the first portion of the hub axle of the hub illustrated in FIGS. 2–7;

FIG. 15 is a partial, cross-sectional view of the inner sleeve portion of the hub illustrated in FIGS. 2–7;

FIG. 16 is an outer end elevational view of the inner sleeve portion illustrated in FIG. 15;

FIG. 17 is an inner end elevational view of the inner sleeve portion illustrated in FIGS. 15 and 16;

FIG. 18 is a side elevational view of the rear hub illustrated in FIGS. 1–7, prior to mounting the assembled hub on the rear fork of the bicycle;

FIG. 19 is a side elevational view of the rear hub illustrated in FIGS. 1–7 and 18, after mounting the assembled hub on the rear fork of the bicycle;

FIG. 20 is a side elevational view of the rear hub illustrated in FIGS. 1–7, 18 and 19, with one side of the rear hub released from the rear fork of the bicycle, and the hub body spaced from the freewheel;

FIG. 21 is a side elevational view of the rear hub illustrated in FIGS. 1–7 and 18–20, with the hub body released from the rear fork of the bicycle and detached from the freewheel;

FIG. 22 is a side elevational view of the rear hub illustrated in FIGS. 1–7 and 18–21, with the hub body completely removed from the rear fork of the bicycle;

FIG. 23 is an enlarged, partial cross-sectional view of the spacer and first portion of the hub axle with the abutment member arranged in the groove to show the relative sizes of the longitudinal groove and abutment member;

FIG. 24 is an enlarged, partial cross-sectional view of the spacer and first portion of the hub axle with the abutment member arranged in the groove FIG. 25 is an outer end elevational view of a modified spacer in accordance with a second embodiment of the present invention;

FIG. 26 is a side elevational view of the spacer illustrated in FIG. 25;

FIG. 27 is a cross-sectional view of the spacer illustrated in FIGS. 25 and 26 as viewed along section line 27—27 of FIG. 25; and FIG. 28 is a side elevational view of modified first portion of a hub axle with portions broken away to show a modified abutment member in accordance with a third embodiment of the present invention.

DETAILED DESCRIPTION OF THE PREFERRED EMBODIMENTS

Referring initially to FIG. 1, a bicycle 10 is illustrated with a rear hub in accordance with the present invention installed thereon as discussed below. Bicycle 10 has a frame 12 with a front fork 13 movably coupled thereto and a rear fork 15 fixedly coupled thereto. A rear wheel 16 is rotatably coupled to rear fork 15 via a rear hub 18. A front wheel 14 is rotatably coupled to front fork 13 via a front hub 17. A seat is adjustably coupled to frame 12 and a handlebar 11 is coupled to front fork 13 for turning front wheel 14. A drive train 19 is coupled to frame 12 for propelling bicycle 10. Drive train 19 basically includes a front set of sprockets 19a, a pair of crank arms 19b with pedals 19c, a drive chain 19d and a set of rear sprockets 19e. Front sprockets 19a are rotatably coupled to frame 12 via a bottom bracket (not shown). Rear sprockets 19e are coupled to rear hub 18 of rear wheel 16 in a relatively conventional manner.

Since the various components of bicycle 10 are well known in the art, these parts will not be discussed or illustrated in detail herein, except as they are modified in accordance with the present invention. More specifically, components of bicycle 10 will not be discussed or illustrated herein, except as they relate to rear hub 18. Moreover, it will be apparent to those skilled in the art from this disclosure that various conventional bicycle parts such as brakes, derailleurs, additional sprockets, etc., which are not illustrated and/or discussed herein, can be used in conjunction with the present invention.

Referring now to FIGS. 2–7, rear hub 18 basically includes a hub axle 20, a hub body 22, a freewheel 24 and a spacer 26. Hub axle 20 is rotatably supported within an interior passageway of hub body 22 and extends axially from both ends of hub body 22. Spacer 26 is preferably non-rotatably and axially movably supported on one end of hub axle 20 at a free end of hub body 22 to provide an axial space between hub body 22 and one side of rear fork 15, as seen in FIGS. 2 and 3. Freewheel 24 is preferably mounted on the other end of hub axle 20. Hub axle 20 is preferably formed of two parts releasably coupled together so hub body 22 and be separated from freewheel 24. Of course it will be apparent to those skilled in the art from this disclosure that the present invention can be used with hubs that do not have a freewheel. Thus, the term "sprocket support member" is used herein to refer to a portion of the hub that has at least one sprocket with or without a freewheel.

Basically, a part of freewheel 24 is releasably and non-rotatably coupled to a part of hub body 22 when spacer 26 is in a first position and hub 18 is coupled to rear fork 15, as shown in FIG. 2. Hub axle 20 is formed of two parts threadedly coupled together to allow release of freewheel 24 from hub body 22 without removing freewheel 24 from rear fork 15. Spacer 26 is axially movable from a first position adjacent rear fork 15 to provide an axial space for hub body 22 to be slidably detached from freewheel 24, as shown in FIGS. 2 and 3. Spacer 26 is only movable when hub 18 is not fixedly coupled to rear fork 15. In other words, when hub 18 is assembled and fixedly coupled to rear fork 15, spacer 26 is in the first position of FIG. 2 and does not move.

Hub axle 20 basically includes a first portion 30 and a second portion 32 threadedly coupled to first portion 30 via a first threaded connection, as best seen in FIGS. 4–7 and 14. Preferably, first portion 30 is rotatably supported within an interior passageway of hub body 22 and freewheel 24 is mounted on second portion 32 of hub axle 20. Moreover, first portion 30 is preferably threadedly coupled to second portion 32 such that first portion 30 can be separated from second portion 32. Preferably, hub axle 20 has a diameter large enough to provide enough strength for separable hub axle 20. More specifically, first portion 30 of hub axle 20 preferably has a diameter of about ten millimeters and second portion 32 preferably has a minimum diameter of about ten millimeters to provide adequate strength for separable hub axle 20.

First portion 30 of hub axle 20 is preferably an elongate cylindrical member formed of lightweight, rigid metallic material, such as cast aluminum, titanium, or steel. Of course, first portion 30 could be constructed of any suitable material as needed and/or desired. Moreover, first portion 30 preferably has a substantially constant, circular cross-section with a diameter of about ten millimeters as mentioned above. First portion 30 of hub axle 20 includes a first end section 34, a second end section 36 axially spaced from first end section 34 and a central section 38 extending between first end section 34 and second end section 36.

First end section 34 is preferably provided with external clockwise threads for releasably coupling first portion 30 to second portion 32. Preferably, first end section 34 is provided with conventional clockwise threads. Second end section 36 is configured such that second end section 36 can be provided with a quick release mechanism 37 coupled thereto in a conventional manner. Thus quick release mechanism 37 is used to couple one side of the rear hub 18 to the rear fork 15 in a relatively conventional manner as discussed in more detail below.

Central section 38 includes a transverse recess 39 formed therein with an abutment member 39a at least partially received in recess 39. Accordingly, central section 38 has abutment member 39a extending therefrom. Preferably, recess 39 has a generally circular shape and extends radially inwardly to a depth of about half the diameter of first portion 30. In other words, recess 39 preferably has a depth of about five millimeters. Abutment member 39a is preferably a ball-shaped or spherical member. Additionally, central section 38 of first portion 30 preferably includes a biasing member or spring 39b arranged in recess 39 to bias abutment member 39a in a transverse direction toward spacer 26. Preferably, abutment member 39a has a slightly larger diameter than a receiving groove of spacer 26 such the first portion 30 is overrideably coupled to spacer 26, as discussed in more detail below.

Preferably, second portion 32 is a step-shaped cylindrical member having a varying cross-section for supporting freewheel 24, as best seen in FIGS. 5–7. Moreover, second portion 32 preferably has a minimum diameter of about ten millimeters and is preferably formed of lightweight, rigid metallic material, such as cast aluminum, titanium, or steel. Of course, second portion 32 could be constructed of any suitable material as needed and/or desired. Second portion 32 basically includes a first end section 40, a second end section 42 axially spaced from first end section 40 and a central stepped section 44 extending between first end section 40 and second end section 42.

First end section 40 is preferably provided with external threads for receiving a nut 41. Nut 41 is threadedly coupled to first end section 40 for coupling one side of rear hub 18 to rear fork 15 in a relatively conventional manner. Moreover, first end section 40 preferably has the smaller or minimum external diameter of second portion 32. The minimum external diameter of first end section 40 is preferably about 10 millimeters as mentioned above. Second end section 42 preferably includes a threaded bore 43 formed therein for receiving externally threaded first end section 34 of first portion 30. Preferably, threaded bore 43 is a clockwise threaded bore configured to engage clockwise external threads of first end section 34. Accordingly, when first portion 30 is threadedly coupled to second portion 32, first and second portions 30 and 32 act as a single axle member.

Second end section 42 also preferably has a plurality of circumferentially arranged external gear teeth or splines 47 formed at a free edge thereof, as best seen in FIG. 5. More specifically, splines 47 extend axially toward first portion 30 to the free edge of second end section 42. Splines 47 are sized and configured to non-rotatably engage a portion of hub body 22 as will be discussed in more detail below.

Referring still to FIGS. 4–7, hub body 22 basically includes an outer tubular portion 50, a tubular inner sleeve portion 52 and a pair of bearing assemblies 54 rotatably coupling inner sleeve portion 52 and outer tubular portion 50 together in a freely rotatable manner. First portion 30 of hub axle 20 is preferably rotatably supported by inner sleeve portion 52 within the interior passageway of outer tubular portion 50. Outer tubular portion 50 is preferably releasably and non-rotatably coupled to a portion of freewheel 24 (i.e. a sprocket support member of freewheel 24) as will be discussed in more detail below.

Outer tubular portion 50 is a tubular member with varying internal and external circular cross-sections, as best seen in FIGS. 6–7. Moreover, outer tubular portion 50 is preferably formed of lightweight, rigid metallic material, such as cast aluminum, titanium, or steel. Of course, outer tubular portion 50 could be constructed of any suitable material as needed and/or desired. Outer tubular portion 50 basically includes a pair of annular spoke mounting flanges 51a and 51b axially spaced from each other for coupling hub body 22 to the rim of wheel 16 in a conventional manner. Spoke mounting flanges 51a and 51b extend from opposite sides of outer tubular portion 50 and are adjacent free ends of outer tubular portion 50. A plurality of spokes are coupled to mounting flanges 51a and 51b to secure hub body 22 to wheel 16 in a conventional manner.

Outer tubular portion 50 preferably includes a pair of abutment surfaces or abutment shoulders 53a and 53b facing in opposite directions for securing bearing assemblies 54 against longitudinal movement (i.e. axial) movement towards each other. Outer tubular portion 50 also preferably includes a pair of second abutment surfaces or shoulders 55a and 55b adjacent opposite free ends of outer tubular portion 50. In other words, abutment shoulders 53a and 53b face in axially opposite directions in an axially spaced arrangement, and abutment shoulders 55a and 55b are located axially on the free end sides of abutment shoulders 53a and 53b, respectively.

The pair of abutment shoulders 55a and 55b are axially spaced from the free ends of outer tubular portion 50 such that a pair of annular recesses 57a and 57b are formed adjacent the free ends of outer tubular portion 50. Other members can be received in recesses 57a and 57b. Specifically, recess 57a is configured to receive an enlarged section of inner sleeve portion 52 (discussed in more detail below) and recess 57b is sized and configured to non-rotatably receive an engagement member 58. Recess 57b includes a plurality of radially inwardly extending teeth or splines 59 for non-rotatably mating with engagement member 58. In other words, outer tubular portion 50 preferably includes engagement member 58 non-rotatably coupled thereto.

As best seen in FIGS. 4–7 and 11–13, engagement member 58 is an annular member and is preferably formed of rigid metallic material, such as cast aluminum, titanium, or steel. Of course, engagement member 58 could be constructed of any suitable material as needed and/or desired. Engagement member 58 is preferably frictionally retained in recess 57b and basically includes a first section 60, a second section 62 and a through bore 64. First section 60 has a smaller diameter than second section 62.

A plurality of first external teeth or splines 61 are formed on the external surface of first section 60 and a plurality of second external teeth or splines 63 are formed on the external surface of second section 62. The second teeth or splines 63 are non-rotatably engaged with matching/mating internal teeth or splines 59 of outer tubular portion 50. Preferably, second portion 62 is sized and configured to be received in recess 57b via a press fit or similar mounting method such that engagement member 58 is fixedly coupled with outer tubular portions 50.

First teeth 61 of first section 60 are sized and configured to non-rotatably and slidably engage a portion of freewheel 24. According, outer tubular portion 50 is releasably and non-rotatably coupled to a portion of freewheel 24. Additionally, through bore 64 is sized and configured to rotatably receive inner sleeve portion 52. More specifically, through bore 64 is preferably a circular through bore that has a slightly larger internal diameter than the external diameter of inner sleeve portion 52. Accordingly, engagement member 58 rotates with outer tubular portion 50 about inner sleeve portion 52 via bearing assemblies 54.

Of course, it will be apparent to those skilled in the art from this disclosure that engagement member 58 could be designed to slide relative to outer tubular portion 50 and be fixedly coupled to a portion of freewheel 24 if needed and/or desired. Moreover, engagement member 58 could be integrally formed with outer tubular portion 50 or a portion of freewheel 24 if needed and/or desired. In any case, engagement member 58 allows outer tubular portion 50 to be releasably and non-rotatably coupled to a portion of freewheel 24.

Bearing assemblies 54 are relatively conventional, and basically each include an inner race, a plurality of bearings or spherical steel balls and an outer race. Each outer race contacts an internal surface of outer tubular portion 50 and an abutment shoulder 53a or 53b of outer tubular portion 50 to secure bearing assemblies 54 against axial movement, as discussed above. Each inner race preferably contacts an external surface of inner sleeve portion 52 such that inner sleeve portion 52 is freely rotatable relative to outer tubular portion 50. The enlarged tubular section of inner sleeve portion 52 and engagement member 58 prevent longitudinal (i.e. axial) movement of bearing assemblies 54 away from each other.

Referring to FIGS. 4–7 and 15–17, inner sleeve portion 52 is preferably an elongated tubular member with a step shaped circular cross-section. Additionally, inner sleeve portion 52 is preferably formed of lightweight, rigid metallic material, such as cast aluminum, titanium or steel. Of course, inner sleeve portion 52 could be constructed of any suitable material as needed and/or desired. Inner tubular portion 52 basically includes a supporting section 66, an enlarged tubular section 68 extending from supporting section 66 and a stepped through bore 70 extending through supporting section 66 and enlarged tubular section 68.

Enlarged tubular section 68 has a larger diameter than supporting section 66 for retaining the inner race of one of bearing assemblies 54 against axial movement away from abutment shoulder 53a and receiving spacer 26 therein. Specifically, the external surface of inner sleeve portion 52 is a stepped surface and the internal surface of inner sleeve portion 52 is also a stepped surface. Enlarged tubular section 68 is sized to be freely rotatable within recess 57a of outer tubular portion 50 and extends axially beyond the free edge of outer tubular portion 50. Stepped through bore 70 is basically formed of an internally threaded surface 70a formed in enlarged tubular section 68 and extending to a free edge of enlarged tubular section 68, and an axle support surface 70b extending from threaded surface 70a to the opposite end of inner sleeve portion 52. Preferably, a tapered surface 70c connects threaded surface 70a and support surface 70b and acts as a stop surface limiting axial movement of spacer 26 within enlarged tubular section 68.

Threaded surface 70a of through bore 70 is a generally cylindrical surface with counter-clockwise threads formed therein and preferably has a larger diameter than supporting surface 70b of supporting section 66. Moreover, threaded surface 70a is arranged at a free end of hub body 22 and is sized and configured to threadedly receive spacer 26. Accordingly, through bore 70 extends axially through supporting section 66 and enlarged tubular section 68 of inner sleeve portion 52 to rotatably receive hub axle 20 and threadedly receive spacer 26. More specifically, through bore 70 of inner sleeve portion 52 is sized and configured to rotatably receive first portion 30 of hub axle 20 within supporting section 66 and threadedly receive spacer 26 in enlarged tubular section 68.

Supporting section 66 preferably includes a plurality of internal teeth or splines 67 arranged at a free end thereof. Teeth 67 are sized and configured to non-rotatably and releasably engage teeth 47 of second portion 32 of hub axle 20. In other words, teeth 47 and 67 form engagement serrations for a tight connection between inner sleeve portion 52 and second portion 32 of hub axle 20. Specifically, teeth or splines 67 are axially extending teeth or splines and are circumferentially arranged within inner sleeve 52 to mate with external teeth 47. Accordingly, first portion 30 of hub axle 20 can be rotated relative to second portion 32 and inner tubular sleeve portion 52 when teeth 67 and 47 are non-rotatably engaged with each other. Moreover, once first portion 30 is tightened with second portion 32, and hub 18 is coupled to rear fork 15, inner sleeve portion 52 is non-rotatably coupled with second portion 32. Therefore, inner sleeve portion 52, first portion 30 and second portion 32 act as a single axle of rear hub 18 when hub 18 is fully assembled and coupled to rear fork 15.

Referring to FIGS. 4–7 and 8–10, spacer 26 is preferably a tubular member mounted on first portion 30 of hub axle 20 and has a generally circular cross-section. Spacer 26 is preferably constructed of rigid, lightweight metallic material such as cast aluminum, titanium, steel, etc. Moreover, spacer 26 is preferably constructed as a one-piece, unitary member. Of course, it will be apparent to those skilled in the art from this disclosure that spacer 26 could be constructed of alternate materials or several pieces as needed and/or desired. Spacer 26 is non-rotatably and axially movably supported on first portion 30 of hub axle 20 and basically includes a threaded external surface 72 and an internal through bore 74 extending between a pair of end surfaces 73 and 75. Both the internal bore 74 and external surface 72 extend in a longitudinal or axial direction relative to hub axle 20. Moreover, spacer 26 is threadedly coupled to a portion of hub body 22 (i.e. within enlarged tubular section 68 of inner sleeve portion 52).

External threaded surface 72 of spacer 26 is configured such that rotation of first portion 30 to release first and second portion 30 and 32 from each other causes spacer 26 to move axially toward hub body 22. In other words, since first end section 34 of first portion 30 and threaded bore 43 preferably include clockwise threads to form a first threaded connection. External surface 72 of spacer 26 and threaded surface 70a preferably include counter-clockwise threads to form a second threaded connection. Therefore, spacer 26 moves in an axially opposite direction from the direction of axial movement of first portion 30 of hub axle 20 upon rotation of first portion 30 relative to second portion 32 (i.e. when threads of first end section 34 are engaged with threaded bore 43 of second portion 32).

Internal bore 74 is sized and configured to allow first portion 30 of hub axle 20 to slide axially therein. Internal bore 74 includes a longitudinal groove 76 formed therein with abutment member 39a at least partially located therein. Moreover, groove 76 preferably has a semi-circular cross-sectional shape with a smaller diameter than abutment member 39a and extends axially along the entire axial length of spacer 26. In the illustrated embodiment, groove 76 has a diameter or circumferential width (i.e. maximum circumferential width) of about two thirds of the diameter of abutment member 39a. More specifically, abutment member 39a preferably has a diameter of approximately 3.17 millimeters and groove 76 has a diameter of approximately 2.10 millimeters. Thus, spacer 26 will rotate with first portion 30 unless the biasing force of spring 39b is overcome, as discussed in more detail below. Spacer 26 preferably has an axial length approximately equal to the axial length of internal threaded surface 70a of enlarged tubular section 68 such that spacer 26 can be retracted into enlarged tubular section 68. Additionally, end surface 73 of spacer 26 preferably has a plurality of threaded attachment holes 73a formed therein.

Spacer 26 also preferably includes a retaining member 78 coupled to end surface 73 of spacer 26 as seen in FIGS. 4–7. Retaining member 78 is a plate member with a plurality of attachment holes 78a and a slot 78b formed therein. Slot 78b is sized to receive first portion 30 in a transverse direction. The attachment holes 78a and the slot 78b are configured such that longitudinal groove 76 is closed by retaining member to prevent removal of first portion 30 of hub axle 20 from hub body 22. A plurality of fasteners or bolts 79 extend through attachment holes 78a and into holes 73a to couple retaining member 78 to end surface 73. Therefore, spacer 26 is mounted on first portion 30 of hub axle 20. Of course it will be apparent to those skilled in the art from this disclosure that retaining member 78 could be attached to spacer 26 by any suitable technique as needed and/or desired. Moreover, it will be apparent to those skilled in the art that more or fewer fasteners 79, attachment holes 78a and attachment holes 73a could be used as need and/or desired.

Referring again to FIGS. 6 and 7, freewheel 24 basically includes an inner tubular body 80, an outer tubular body 82 coaxially mounted on inner tubular body 80, a first bearing assembly 84, a second bearing assembly 86, a third bearing assembly 88 and a one-way clutch 90. First and second bearing assemblies 84 and 86 rotatably couple inner tubular body 80 to outer tubular body 84. Third bearing assembly 88 rotatably couples inner tubular body about second portion 32 of hub axle 20. One-way clutch 90 is coupled between inner tubular body 80 and outer tubular body 84 so as to allow one way rotation between inner and outer tubular bodies 80 and 82.

Inner tubular body 80 is releasably and non-rotatably coupled to outer tubular portion 50 of hub body 22 via engagement member 58 when hub 18 is assembled and coupled rear fork 15. As mentioned above, freewheel 24 is coupled to rear hub 18 and many parts of freewheel 24 are relatively conventional. Accordingly, freewheel 24 will not be discussed or illustrated in detail herein, except as modified in accordance with the preferred embodiments of the present invention.

In the preferred embodiment outer tubular body 82 has seven sprockets 19e non-rotatably mounted to the external surface of outer tubular body 82. The spacing between sprockets 19e are maintained by a plurality of spacers in a conventional manner. Accordingly, in the preferred embodiment, freewheel 24 can be considered a sprocket support member. Alternatively, inner tubular body 80 can also be considered the sprocket support member since inner tubular member indirectly supports sprockets 19e. In any case, the sprocket support member or freewheel 24 has a portion releasably and non-rotatably coupled to outer tubular portion 50 of hub body 22 when hub 18 is assembled and coupled rear fork 15.

Of course, it will be apparent to those skilled in the art from this disclosure that freewheel 24 could have more/fewer sprockets 19e as needed and/or desired. For example, freewheel 24 could have a single sprocket 19e coupled thereto. Moreover, it will be apparent to those skilled in the art from this disclosure that an alternate sprocket support member can be provided if needed and/or desired. For example, a simplified sprocket support member could be provided that does not include one-way clutch 90 or other parts of freewheel 24. Accordingly, a "sprocket support member" as used herein includes any member(s), which directly or indirectly supports at least one sprocket.

Referring still to FIGS. 6 and 7, inner tubular body 80 will now be discussed in more detail. Preferably, inner tubular body 80 is constructed of a rigid lightweight material, such as cast aluminum, titanium, steel, etc. Inner tubular body 80 has a step-shaped configuration with an axially extending bore defining a step-shaped internal surface. Basically, inner tubular body 80 has a first inner section 92, a second inner section 94 and an annular wall 96 extending between first inner section 92 and second inner section 94. First inner section 90 has a first effective diameter, while second inner section 94 has a second effective diameter that is larger than the first diameter of the first inner section 92.

First inner section 92 is a tubular section coupled to an inner race of second bearing assembly 86 for rotation therewith. The internal diameter of first inner section 92 is slightly larger than the external diameter of second portion 32, which supports freewheel 24. Annular wall 96 extends radially outward from first inner section 92 to second inner section 94 to provide a space for one-way clutch 90. Second inner section 94 is a tubular section with a set of teeth or splines 95 formed about its internal surface. Teeth 95 extend radially inwardly and are sized and configured to non-rotatably and releasably engage first teeth 61 of engagement member 58.

Referring still to FIGS. 6 and 7, outer tubular body 82 will now be discussed in more detail. Outer tubular body 82 is preferably formed as a one-piece, unitary member constructed of a substantially hard, rigid material. For example, outer tubular body 80 can be constructed of a lightweight metallic material such as aluminum or titanium or a slightly heavier material such as steel. Outer tubular body 82 has an external surface with a plurality of splines 100 extending around its periphery for non-rotatably securing sprockets 19e thereon in a conventional manner. Each of the splines 100 has an abutment stopper 102 extending radially outwardly therefrom. The abutment stoppers 102 limit axial movement of the sprockets 19e on the external surface of outer tubular body 82 in a conventional manner.

One-way clutch 90 is conventional and includes a pawl spring and a pair of pawls (not shown) located 180° apart from each other on the pawl spring. One-way clutch 90 also includes portions of inner and outer tubular bodies 80 and 82 in a conventional manner. In particular, one-way clutch 90 includes an annular groove and a pair of pawl seats of inner tubular body 80 and ratchet teeth of outer tubular body 82. The pawl spring is located within groove for securing the pawls in the pawl seats in a conventional manner. The pawls normally engage the ratchet teeth such that outer tubular body 82 can rotate in one direction about the longitudinal axis but cannot rotate in the other direction in a conventional manner.

Referring to FIGS. 5–7, 18 and 19, initial assembly of rear hub 18 will now be discussed in more detail. Preferably, second portion 32 of hub axle 20 has freewheel 24 already mounted thereon, and hub body 22 is basically assembled. First portion 30 is not yet connected to hub body 22 and second portion 32. Spacer 26 is already mounted on first portion 30 and retaining member 78 is connected to spacer 26 as seen in FIG. 5. In assembling rear hub 18, hub body 22 is non-rotatably engaged with second portion 32 and inner tubular body 80. First portion 30 is then slidably inserted into inner tubular portion 52 of hub body 22, and rotated in a counter-clockwise direction until spacer 26 is retracted into enlarged tubular section 68. First portion 30 is then rotatably coupled to second portion 32, such that hub body 22 and second portion 32 with freewheel 24 mounted thereon are in close tight contact with each other.

Preferably, spacer 26 is completely retracted into enlarged tubular section 68 of inner sleeve portion 52 prior to rotating first portion 30 in a clockwise direction. Accordingly, as first portion 30 is threadedly coupled to second portion 32, spacer 26 will also rotate to move spacer 26 axially away from hub body 22. Therefore, a space between spacer 26 and rear fork 15 can be gradually reduced until spacer 26 reaches the location of FIG. 18, and can be coupled to rear fork 15 as shown in FIG. 19. The parts of rear hub 18 are held in close contact so a pair of mounting portions 15a and 15b of rear fork 15 can be mounted on hub axle 20, as seen in FIGS. 18 and 19. Mounting portions 15a and 15b are plate members, each having a mounting slot formed therein in a conventional manner.

Referring to FIGS. 18 and 19, after hub axle 20 is properly aligned in the mounting slots of mounting portions 15a and 15b, nut 41 is tightened against mounting portion 15a and quick release 37 is tightened down against mounting portion 15b such that rear hub 18 is fixedly coupled to mounting portions 15a and 15b, as seen in FIG. 19. In this arrangement, first and second portions 30 and 32 of hub axle 20, together with inner sleeve portion 52 act as a single hub axle of rear hub 18 (shown in FIG. 6 and discussed above). Additionally, in this assembled position, free wheel 24 and outer tubular portion 50 act in a conventional manner to supply driving torque to the rear wheel of the bicycle. A preferred (ideal) space or gap is provided between spacer 26, mounting portion 15b and quick release 37 due to the configurations of abutment member 39a and groove 76 of spacer 26, as discussed in more detail below.

Referring to FIGS. 20–22, when the rider needs to remove the rear wheel, the rear wheel can be removed without removing the second portion 32 and the free wheel 24 from mounting portion 15a. Specifically, the handle of quick release 37 is rotated to release mounting portion 15b from hub 18. First portion 30 is then rotated via quick release 37 to release first portion 30 from second portion 32 (i.e. a counter-clockwise direction), as seen in FIG. 20. During this rotation, due to the configuration of the external threads of spacer 26, spacer 26 will move axially toward hub body 22 to create an axial space between spacer 26 and mounting portion 15b.

After a predetermined amount of rotation of first portion 30 relative to second portion 32, spacer 26 will be completely retracted within enlarged tubular section 68 and first portion 30 will completely threadedly disengage second portion 32. Therefore, hub body 22 with first portion 30 mounted therein can be moved axially away from second portion 32 and freewheel 24, as seen in FIG. 21. Once the axial space is provided and hub body 22 is moved axially away from second portion 32 and freewheel 24, hub body 22 will be non-rotatably disengaged from second portion 32 and freewheel 24, as also seen in FIG. 21. Hub body 22 cannot be completely removed from rear fork 15 until first portion 30 is no longer threadedly engaged with second portion 32, and hub body 22 is no longer engaged with second portion 32 or freewheel 24.

Referring to FIGS. 18, 19, 23 and 24, the relation of abutment member 39a and groove 76 in providing the preferred (ideal) space or gap will now be discussed in more detail. Specifically, abutment member 39a has a slightly larger diameter than groove 76. Accordingly, abutment member 39a is preferably only partially received in groove 76 as seen in FIG. 23. Thus, spacer 26 rotates with first portion 30 when abutment member 39a is received in groove 76. However, after hub 18 is assembled (FIG. 18) and arranged between mounting portions 15a and 15b (i.e. before quick release 37 is tightened), first portion 30 is rotated until spacer 26 contacts mounting portion 15b. When spacer 26 contacts mounting portion 15b, axial movement of spacer 26 is prevented. Therefore, if first portion 30 is rotated when spacer 26 is in this position, abutment member 39a will be forced out of groove 76 and into recess 39 as seen in FIG. 24. In other words, the rotating force applied to first portion 30 overcomes the biasing force of spring 39b and first portion 30 can continue to rotate until quick release 37 is properly aligned with mounting portion 15b. Once quick release 37 is properly aligned, quick release 37 is tightened against mounting portion 15b to secure hub 18 to rear fork 15 as seen in FIG. 19. The arrangement of the groove 76 and abutment member 79a aid in consistently providing an accurate positive connection between hub 18 and rear fork 15.

Additionally, with the arrangement of the present invention, it is not necessary to remove the drive chain 19d from the rear sprocket 19e because the freewheel 24, rear sprockets 19e and second portion 32 of hub axle 20 remain fixedly coupled to mounting portion 15a. Now, the rear wheel 16 can be removed and repaired or adjusted without removing the other portions of rear hub 18 from the bicycle 10, as seen in FIG. 22. Once the desired wheel maintenance is completed, hub body 22 can be easily reinstalled and connected to second portion 32 and freewheel 24 in a manner similar to the initial assembly described above.

SECOND EMBODIMENT

Referring to FIGS. 25–27, a spacer 226 is illustrated in accordance with a second embodiment of the present invention. This second embodiment is identical to the first embodiment except spacer 26 of the first embodiment has been modified in this second embodiment. Specifically, spacer 226 of this second embodiment is identical to spacer 26 of the first embodiment except spacer 226 of this embodiment includes an additional longitudinal groove formed in the internal bore. Descriptions of rear hub 18 of the first embodiment also apply to this second embodiment except as modified below. Moreover, spacer 226 is sized and configured to be used with rear hub 18 of the first embodiment. Accordingly, this second embodiment will not be discussed or illustrated in detail herein.

Spacer 226 is a tubular member formed of lightweight, rigid metallic material, such as cast aluminum, titanium or steel. Preferably, spacer 226 is formed as a one-piece, unitary member. Of course spacer 226 could be constructed of other materials or several parts as needed and/or desired. Spacer 226 basically includes a threaded external surface 272 and an internal through bore 274 extending between a pair of end surfaces 273 and 275. Both the internal bore 274 and external surface 272 extend in an axial direction relative to hub axle 20.

Internal bore 274 includes a pair of longitudinal grooves 276 sized and configured to receive abutment member 39a therein. Each groove 276 is identical to groove 76 of the first embodiment. Accordingly, grooves 276 will not be discussed or illustrated herein. External surface 272 has counter-clockwise threads formed thereon such that it operates in the same manner as spacer 26 of the first embodiment. However, because spacer 226 has a pair of grooves 276, spacer 226 can be mounted on first portion 30 of hub axle 20 in either of two orientations. Spacer 226 also preferably includes a plurality of threaded attachment holes 273a for attaching retaining member 78 thereto.

THIRD EMBODIMENT

Referring to FIG. 28, a first portion 330 of a hub axle is illustrated in accordance with a third embodiment of the present invention. This third embodiment is identical to the first embodiment except first portion 330 has been modified in this third embodiment. Specifically, first portion 330 includes a modified abutment member 339a extending therefrom. The abutment member 39a of the first embodiment has been eliminated in this third embodiment. Descriptions of rear hub 18 of the first embodiment also apply to this third embodiment except as modified below. Moreover, first portion 330 and abutment member 339a are sized and configured to be used with rear hub 18 of the first embodiment. Accordingly, this third embodiment will not be discussed or illustrated in detail herein.

First portion 330 basically includes a first end section 334, a second end section 336 axially spaced from first end section 334 and a central section 338 extending between first end section 334 and second end section 336.

First end section 334 is preferably provided with external clockwise threads for releasably coupling first portion 330 to second portion 32. Second end section 336 is configured such that second end section 336 can be provided with a quick release mechanism coupled thereto in a conventional manner. Central section 338 includes a transverse recess 339 formed therein with abutment member 339a received in recess 339. Abutment member 339a is preferably an elongated rod shaped member with a semi-spherical end extending from central section 338 in this second embodiment. The diameter of the semi-spherical end of abutment member 339a is preferably slightly larger then the diameter of groove 76 such that the preferred space or gap can be provided. A spring or biasing member 339b urges abutment member 339a toward spacer 26 in a manner similar to the first embodiment. Accordingly, central section 338 has a portion of abutment member 339a extending therefrom. First portion 330 of this third embodiment functions in the same way as first portion 30 of the first embodiment.

Alternatively, a rod shaped abutment member could be utilized without a spring or biasing member. Such a rod shaped abutment member would be sized to fill the recess of the first portion and extend therefrom. Moreover, the groove of spacer 26 could have other configurations as need and/or desired. For example the groove could have a square or rectangular cross-section.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub comprising:
   a hub axle having first and second portions threadedly coupled together via a first threaded connection;
   a hub body having an outer tubular portion and an interior passageway with said first portion of said hub axle being rotatably supported therein;
   a sprocket support member releasably and non-rotatably coupled to said outer tubular portion of said hub body, said sprocket support member being mounted on said second portion of said hub axle; and
   a spacer non-rotatably and axially movably supported on said first portion of said hub axle at a free end of said hub body, said spacer being threadedly coupled to a portion of said hub body via a second threaded connection, said first and second threaded connections being configured such that rotation of said hub axle to release said first and second portions causes said spacer to move axially toward said hub body.

2. The bicycle hub according to claim 1, wherein said hub body includes a tubular inner sleeve portion with said first portion of said hub axle located therein.

3. The bicycle hub according to claim 2, wherein said spacer is threadedly coupled to said inner sleeve portion.

4. The bicycle hub according to claim 3, wherein said inner sleeve portion is releasably and non-rotatably coupled to said second portion of said hub axle.

5. The bicycle hub according to claim 4, wherein
said inner sleeve portion includes an enlarged tubular section with said spacer threadedly coupled therein at said free end of said hub body.

6. The bicycle hub according to claim 5, wherein
said spacer has external counter-clockwise threads, said enlarged tubular section has internal counter-clockwise threads and said first threaded connection is a clockwise threaded connection.

7. The bicycle hub according to claim 4, wherein
said inner sleeve portion and said second portion of said hub axle have engagement serrations for a tight connection therebetween.

8. The bicycle hub according to claim 1, wherein
one of said first portion and said spacer includes a longitudinal groove and the other of said first portion and said spacer includes a abutment member located in said longitudinal groove to prevent relative rotation therebetween.

9. The bicycle hub according to claim 8, wherein
said spacer includes a retaining member coupled to a free end of said spacer prevent removal of said first portion of said hub axle from said hub body.

10. The bicycle hub according to claim 8, wherein
said first portion of said hub axle has said abutment member extending therefrom and said spacer has said longitudinal groove sized to partially receive said abutment member therein.

11. The bicycle hub according to claim 10, wherein
said first portion of said hub axle includes a transverse recess with said abutment member extending from said recess.

12. The bicycle hub according to claim 11, wherein
said first portion of said hub axle includes a biasing member arranged in said recess to bias said abutment member in a transverse direction toward said spacer.

13. The bicycle hub according to claim 1, wherein
said abutment member is a substantially ball-shaped member partially received in said recess.

14. The bicycle hub according to claim 13, wherein
said groove has a circumferential width smaller than a diameter of said abutment member.

15. The bicycle hub according to claim 14, wherein
said first portion of said hub axle includes a biasing member arranged in said recess to bias said abutment member in a transverse direction toward said spacer.

16. The bicycle hub according to claim 1, wherein
said abutment member is an elongated rod-shaped member partially received in said recess.

17. The bicycle hub according to claim 11, wherein
said spacer includes a retaining member coupled to a free end of said spacer prevent removal of said first portion of said hub axle from said hub body.

18. The bicycle hub according to claim 10, wherein
said spacer has a pair of said longitudinal grooves formed therein.

19. The bicycle hub according to claim 10, wherein
said spacer is a cylindrical member with external threads and a central through bore sized to receive said first portion of said hub axle, said longitudinal groove being formed in said through bore.

20. The bicycle hub according to claim 19, wherein
said through bore of said spacer includes a pair of said longitudinal grooves.

21. The bicycle hub according to claim 19, wherein
said spacer has external counter-clockwise threads formed thereon and said first threaded connection is a clockwise threaded connection.

22. The bicycle hub according to claim 1, wherein
said outer tubular portion of said hub body includes an engagement member non-rotatably coupled thereto to releasably and non-rotatably couple said sprocket support member to said hub body.

23. The bicycle hub according to claim 1, wherein
said hub body includes a tubular inner sleeve portion with said first portion of said hub axle rotatably arranged therein.

24. The bicycle hub according to claim 23, wherein
said inner sleeve portion is releasably and non-rotatably coupled to said second portion of said hub axle.

25. The bicycle hub according to claim 24, wherein
said inner sleeve portion and said second portion of said hub axle have engagement serrations for a tight connection therebetween.

26. The bicycle hub according to claim 23, wherein
said inner sleeve portion includes an enlarged tubular section with internal counter-clockwise threads formed therein.

27. The bicycle hub according to claim 26, wherein
said spacer includes external counter-clockwise threads sized to engage said internal counter-clockwise threads of said inner sleeve portion.

28. The bicycle hub according to claim 1, wherein
said first threaded connection is a clockwise threaded connection and said second threaded connection is a counter clockwise threaded connection.

29. The bicycle hub according to claim 1, wherein
said first portion of said hub axle includes a quick release mechanism mounted on a free end of said first portion.

30. The bicycle hub according to claim 1, wherein
said sprocket support member includes a freewheel.

* * * * *